Figure 1:
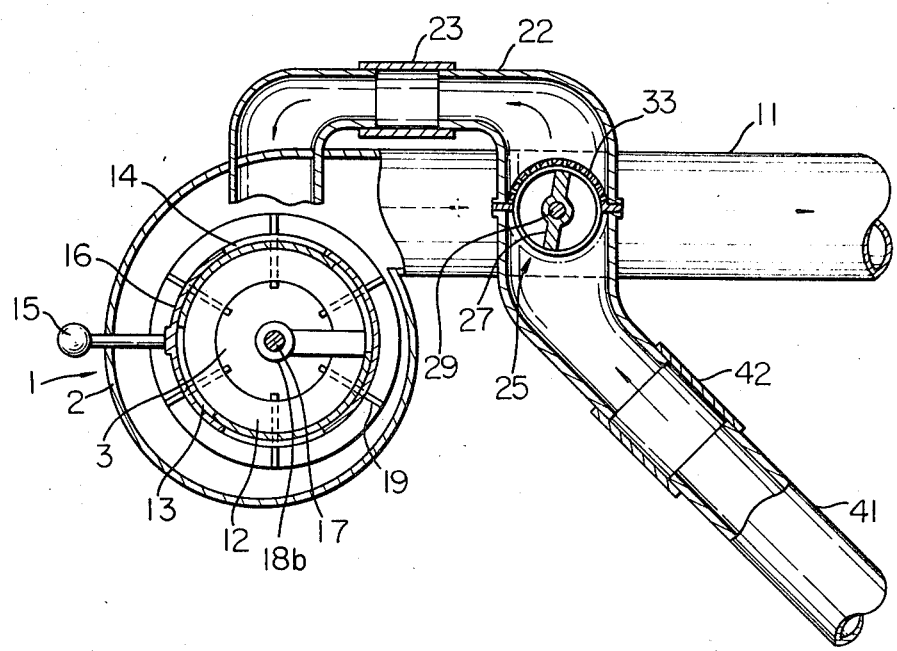

United States Patent

[11] 3,600,041

[72] Inventors Shuichi Hirano
   19, Kamiichimachi Mikkachi,
   Nakaniikawa-gun, Toyama-ken;
   Seiichi Noda, 2-54, Nanazukamachi, Kizu,
   Kahoku-gun, Ishikawa-ken, both of, Japan
[21] Appl. No. 773,604
[22] Filed Nov. 5, 1968
[45] Patented Aug. 17, 1971

[54] SUCTION CONVEYER
   5 Claims, 11 Drawing Figs.
[52] U.S. Cl. ................................................ 302/23, 302/50
[51] Int. Cl. ............................................... B65g 53/04
[50] Field of Search .................................... 302/23, 50

[56] References Cited
UNITED STATES PATENTS
908,445  1/1909  Carlton ........................ 302/23

| | | | |
|---|---|---|---|
| 1,173,073 | 2/1916 | Williams........................ | 302/23 |
| 2,087,464 | 7/1937 | Ayers ............................ | 302/23 |
| 2,904,847 | 9/1959 | Burns ............................ | 302/23 |
| 3,205,016 | 9/1965 | Panning........................ | 302/23 |

FOREIGN PATENTS
1,057,451  10/1953  France ........................ 302/23

Primary Examiner—Andres H. Nielsen
Attorneys—Robert E. Burns and Emmanuel J. Lobato ABSTRACT: A suction conveyor for conveying material such as rice, wheat, barley, beans and maize. The suction conveyor of the invention comprises a conveying mechanism having a suction fan by suction air and particular mechanical separating means for separating air from the conveying material disposed in a suction passage at a preceding position before the suction fan. The material separated from the suction air by the mechanical separating means is discharged from the suction conveyor by means of air blowing.

PATENTED AUG 17 1971
3,600,041
SHEET 4 OF 4
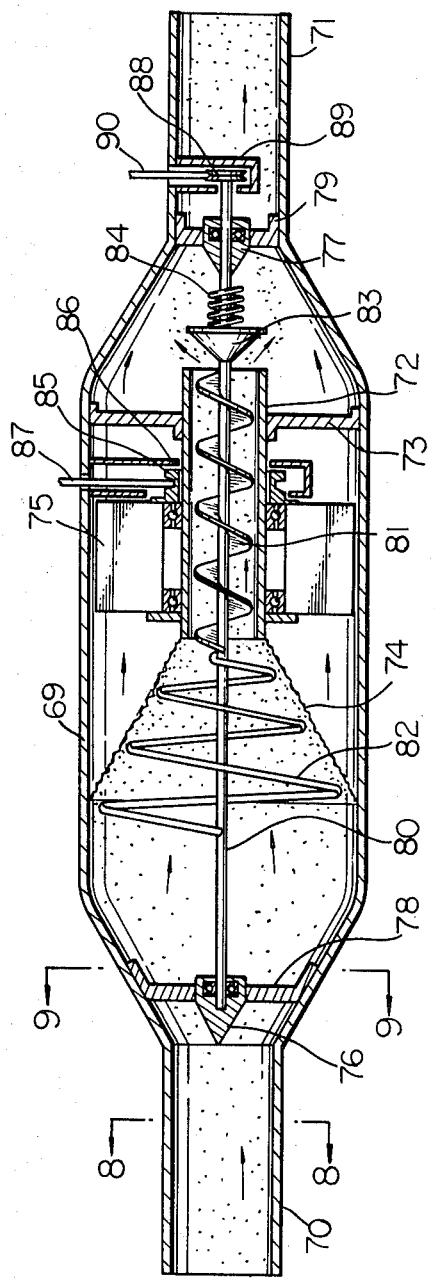
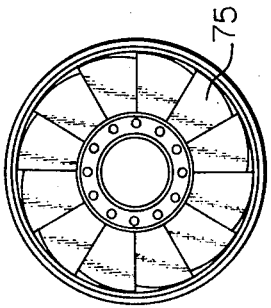
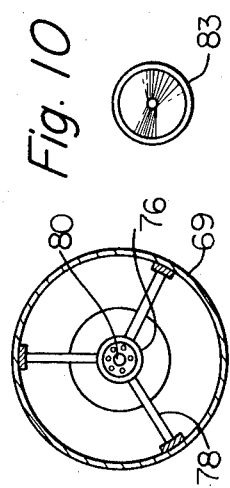
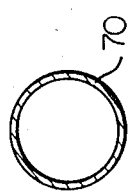

SUCTION CONVEYER

This invention relates to a suction conveyor for continuous conveyance, by sucking in various materials to be conveyed such as rice, wheat, barley, beans and maize.

It is necessary to provide a feeding device for the materials when belt conveyor screw conveyor or bucket conveyor is used for conveying these materials and in case of an unloader in which the materials are charged into a chamber in which rotating vanes are provided and are flung upward by the rotation of the vanes, there is a possibility of damage of the conveyed material due to the materials striking the vanes.

A principal object of the present invention is to provide an improved suction conveyor having very small and compact construction, for continuously conveying various materials, such as rice, wheat, barley, beans and maize with economical condition.

Another object of the present invention is to provide a suction conveyor having improved construction by which the damage of the conveyed material can be prevented as the conveying materials do not pass through it.

When the suction conveyor of the present invention is used, it is only necessary to insert into the accumulated material a flexible suction hose attached to the suction pipe which is connected to the suction fan chamber, thereby only the material is sucked together with the outside air and only the material is led to the discharge pipe connected to the suction fan chamber while the sucked air is separated from the material, and the material can be transported to any desired place by way of a discharge-wind caused by the separated air.

Consequently, the suction conveyor of the present invention can be constructed as simple and compact, further the damage to the conveyed material can be prevented as the materials do not pass through it, the loading, unloading and conveyance of the materials can be carried out automatically, continuously and effectively by easy handling of the suction conveyor of the invention.

The objects and advantages of the invention will be more fully understood from the following description and claims in conjunction with the accompanying drawings which illustrate by way of examples in accordance with the invention.

Figure 2:
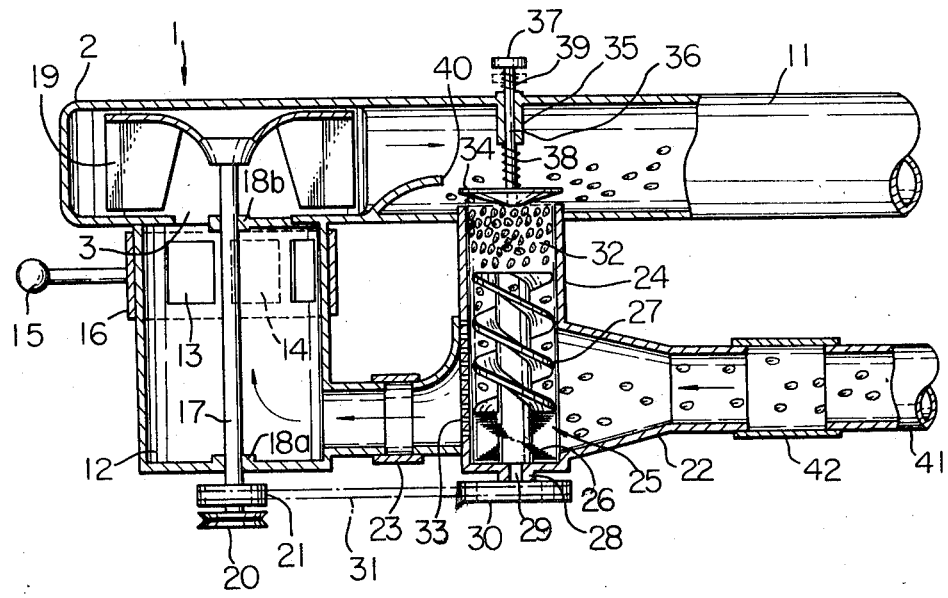
Figure 3:
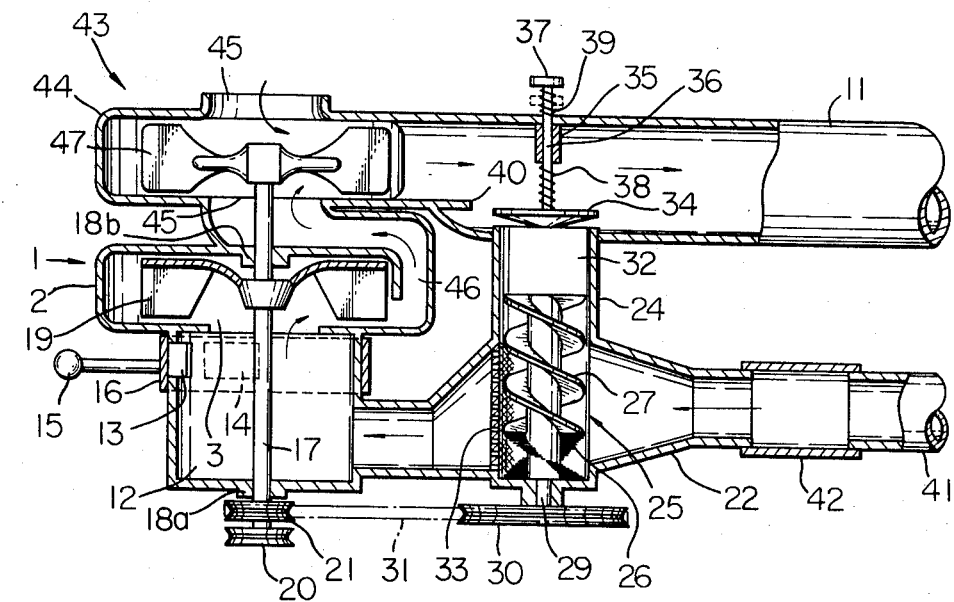
Figure 4:
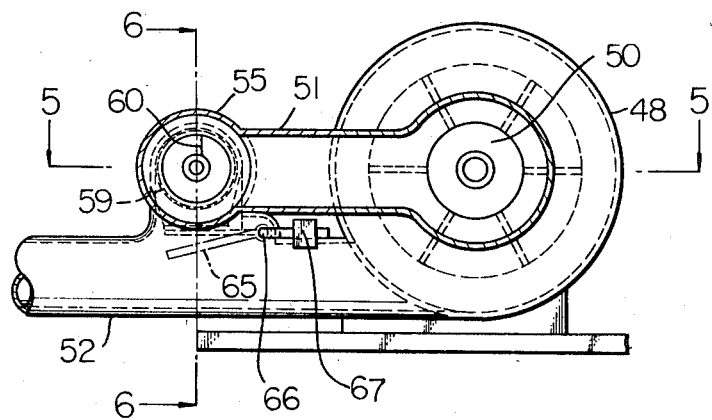
Figure 5:
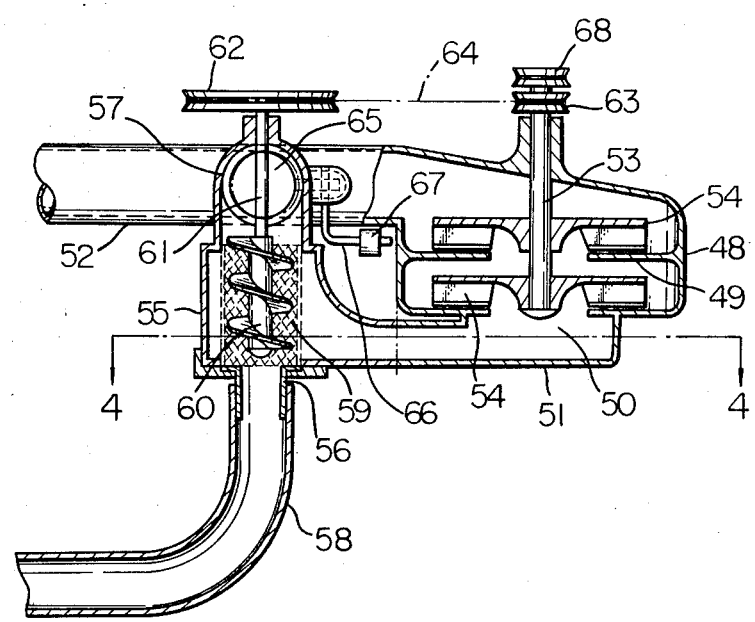
Figure 6:
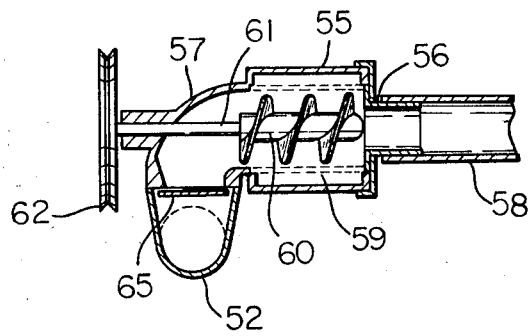

In the drawings:

FIG. 1 is a lengthwise sectional views of the first embodiment of the suction conveyor of the invention, FIG. 2 is a plan sectional view of the suction conveyor shown in FIG. 1, FIG. 3 is a side view, partly in section, of the second embodiment of the suction conveyor of the invention, FIGS. 4, 5 and 6 are sectional views of the suction conveyor of the invention, wherein FIG. 4 is the vertical sectional view taken along line 4—4 in FIG. 5, FIG. 5 is the plan sectional view taken along line 5—5 in FIG. 4, while FIG. 6 is the sectional view taken along line 6—6 in FIG. 4, FIG. 7 is a plan sectional view of the fourth embodiment of the suction conveyor of the invention, FIG. 8 is a sectional view, taken along line 8—8, of the suction conveyor shown in FIG. 7, FIG. 9 is a sectional view, taken along line 9—9, of the suction conveyor shown in FIG. 7, FIG. 10 is an elevational view of the cover used for the suction conveyor shown in FIG. 7, FIG. 11 is an elevational view of the fan of the suction conveyor shown in FIG. 7.

The suction conveyor is provided with a suction fan comprising a spiral type circular body 2. A suction aperture 3 is provided at the middle of a sidewall of the circular body 2 and a discharge pipe 11 is connected to a terminal opening of the spiral air passage defined by the peripheral wall of the circular body 2. The discharge pipe 11 extends straightaway. A cylindrical air chamber 12 is connected to the suction aperture 3 of the inlet side of the circular body 2 and mounted concentrically with the circular body 2. Suction holes 13 are provided at the base portion of the cylindrical air chamber 12 before and behind, and air passages 14 which coincide with the suction holes 13 are provided at the peripheral portion of the cylindrical air chamber 12, and an adjusting ring 16 to which a handle 15 is disposed, is mounted on the peripheral portion of the chamber 12 such that it is only turnable.

A rotating shaft 17 is supported by bearings 18a, 18b mounted on the circular body 2 and the air chamber 12, and passes through the center of the circular body 2 and the air chamber 12. A fan 19 disposed in the circular body 2 is secured to the shaft 17, a driven pulley 20 and the driving pulley 21 are mounted on a parts of the shaft 17 which extend outside the air chamber 12.

An inverted U-shaped suction pipe 22 is connected to an opening at the upper wall of the top portion of the air chamber 12 with a flexible tube 23 disposed in the intermediate portion. The suction pipe 22 is disposed parallel to the discharge pipe 11. A projecting portion formed at the forward portion of the suction pipe 22 faces the discharge pipe 11 and its tip portion is inclined forward and downward so that the opening formed at the projecting portion is connected with the opening of the discharge pipe 11 by means of a transfer tube 24 in such a manner that the opening formed at the projecting portion faces the opening of the upper wall.

A screw conveyor 25 is disposed with about half of the forward part of the suction pipe 22 and its other half in the transfer tube 24. One end portion of the screw conveyor 25 is formed by a brush screw 26 and the other part of it is formed of metal screw 27, a rotating shaft 29 of the screw conveyor 25 protrudes at an end of it which is supported by a bearing 28 mounted on one side of the suction pipe 22. A belt 31 is looped around a pulley 30 secured to the tip of the rotating shaft 29 and the driving pulley 21. A space 32 is formed in the tip end of the transfer tube 24 and a screen 24 is disposed to the upper portion of the screw conveyor 25 which is inside the forward portion of the suction pipe 22 but above the screw conveyor 25, that is, the screen 33 is located at the position opposite the suction side and adjacent to the screw conveyor 25. The screen 33 is connected the transfer tube 24. The mesh of the screen 33 is such that the conveying material does not pass through it.

A conical-shaped shutter cover 34 disposed at the outlet end of the transfer tube 24. The conical-shaped shutter cover 34 is secured to a rod 36 slidably passing through a bearing sleeve 35 which is secured in the inside wall of the discharge pipe 11. A spring 39 is inserted between a knob 37 secured to the projecting portion of the base of the rod 36 and the discharge pipe 11, while a spring 28 is inserted between a bearing sleeve 35 and the discharge pipe 11, both springs 38, 39 are mounted on the rod 36. Therefore the conical-shaped shutter cover 34 is normally pressing against the outlet of the transfer tube 24 by the spring 38 to close the outlet. A guide plate 40 is disposed in an inwardly extending manner on the wall of one side of the discharge pipe 11 between the conical-shaped shutter cover 34 and the spiral-type circular body 2 of the suction fan 1, and a section hose 41 made of a certain flexible material is connected to the tip of the suction pipe 22 by way of a flexible tube 42 having a suitable length, and a suction nozzle (not shown) is connected to the tip of the suction hose 41.

Next, an example of the operation of the suction conveyor proposed, as described above, is explained for suction conveyance of materials such as rice, wheat, beans, etc.

When power is transmitted to the pulley 20, the rotating shaft 17 and the fan attached to the shaft 17 rotate, and at the same time, power is transmitted from the pulley 21 to rotating shaft 29 by way of the pulley 30, and the screw conveyor 25 rotates.

Then, the adjusting ring 16 is turned by means of the handle 15 so that the passages 14 and the suction holes of the air chamber 12 do not coincide to prevent entrance of outside air into the air chamber 12 from the passages 14 and the suction holes 13. The suction nozzle (not shown) attached to the tip of the suction hose 41 is inserted into the accumulated material by which the material is sucked into the suction hose 41 together with the outside air by the suction effect of the rotating fan 19, then sucked into the suction tube 22 by way of the flexible tube 42 and strikes screw conveyor 25 where the air passes through screen 33 and then into the air chamber 12 to separate the material from the air. Air is sucked into the suction fan 1 and this suction wind flows into the discharge pipe 11 and is discharged outside the machine from its open end.

On the other hand, the material which has been separated from the air is sent to the space 32 at the tip portion of the transfer tube 24 along the inside surface of the screen 33 by means of brush screw 26, metal screw 27 of the screw conveyor 25, and when the space becomes filled with the material, the conical-shaped shutter cover 34 and rod 36 recede gradually against the spring 38 in accordance with the pressure of the material sent into space 23 to form a gap between the conical shaped shutter cover 34 and the outlet at the tip of the transfer tube 24, the material in the space 32 is pushed out into the discharge pipe 11 through the above-mentioned gap, during which reverse wind into the transfer tube 24 is prevented by the conical-shaped shutter cover 34, the material which has been introduced into discharge pipe 11 is transported by the discharge wind blown into discharge pipe 11 from the suction fan 1 and is discharged far away outside the machine from the mouth of the pipe 11.

Suction conveyance of the material is carried out continuously in this manner. And, when the operation is completed, the adjustment ring 16 is turned by means of the handle 15 and its passages 14 and the suction holes 13 of the air chamber 12 are made to coincide, by which outside air passes directly into the air chamber 12 from the suction holes 13. This is sucked into suction fan 1 from the suction hole by which the effect of sucking in the material from the suction hose 41 together with outside air is stopped. Also, when the knob 37 is grasped and pulled outward against the spring 38, the rod 36 and the conical-shaped shutter cover 34 are pulled to open the outlet of transfer tube 24 to drop residual material in the space 32 into the discharge pipe 11 from its outlet and is transported and discharged outside the machine by the discharger air blown from the suction fan 1.

Referring to FIG. 3 a fan chamber is disposed between the suction fan 1 and discharge pipe 11 shown in FIGS. 1 and 2. A discharge fan chamber 43 for discharging air is installed parallel and concentrically with the outside of the suction fan 1. The discharge fan chamber 43 comprises a circular body 44, suction holes 35 are disposed at the middle of both sidewalls of the discharge fan chamber 43. The inner suction hole 45 and circumferential wall opening of the circular body 2 of the suction fan 1 are connected by means of an air passage 46, and the discharge pipe 11 is connected to the circumferential wall opening of the circular body 44. The rotating shaft 17 passes through the air chamber 12 and the circular bodies 2, 44 concentrically, and is supported by the bearings 18a, 18b and the fan 19 is secured to the part of the shaft positioned inside its circular body 2 and a fan 47 to the part which extends into the circular body 44. All other symbols are the same as those in FIGS. 1 and 2.

In the second embodiment of the suction conveyor mentioned above, the shaft 17 rotates together with the fans 19, 47 when the pulley 20 is driven. Air, which is sucked into the circular body 2 by the fan 19 is blown out to the air passage 36 to be sent to the suction opening 45 of the fan chamber 44, and at the same time, is sucked into the fan chamber 44 by the sucking effect of the fan 47. Also, outside air is sucked into the fan chamber 44 from the outer suction hole 45, these winds are blown into the discharge pipe 11. Therefore the material, which is conveyed into the discharge pipe 11 from the transfer tube 24, is transported and discharged outside the suction conveyor by its discharge wind.

In the above-mentioned two embodiments of the invention, the vanes of the screw conveyor 25 may be formed with a brush or elastic material such as rubber, or it may be made of metal with brush or rubber mounted on its edge portion, the air passage may be improved by making the vanes in the form of a screw ribbon and the clearance between the screw conveyor 24, and the screen 33 is set appropriately in accordance with the kind of materials used in order to prevent damage to the screw conveyor itself, and at the same time, the screen 33 can be cleaned in order to prevent plugging up of the screen openings.

Referring to FIGS. 4, 5 and 6, the suction conveyor of the third embodiment is provided with a suction fan chamber of the circular body type 48 which is partitioned into two chambers by a partition 49 in which an air hole is provided in the middle. A suction part 50 is formed in the middle of a sidewall of the fan the clearance 48, and a suction pipe 51 is connected with the kind suction part 50 and extends toward the position facing the forward part of the suction fan chamber 48. A discharge pipe 52 is connected to an opening formed at the lower part of the circumferential wall of the other side of the suction fan chamber 48. A rotating shaft 53 passes through the center of the suction fan chamber 48 and is supported by bearing parts mounted upon the other wall of the chamber 48. A pair of fans 54 are secured to the rotating shaft 53, in such a way that the fans 54 are installed in the respective chambers partitioned by the partition 49. A laterally attached cylindrical transfer tube 55 is connected with the suction pipe 51 at its front end, a suction inlet 56 is connected with an inlet portion of the transfer tube 55, a discharge tube 57 for conveying material into the discharge pipe 52 is connected to the other end of the transfer tube 55. A suction hose 58 made of flexible material is connected to the suction inlet 56 and the opening at the lower end of the discharge tube 57 is connected to the opening formed at the upper surface of the discharge pipe 52.

A cylindrical screen 59 is concentrically disposed inside cylindrical transfer tube 55. The mesh of the screen 59 is provided with a predetermined size so that the free passing of the conveying material can be satisfactorily prevented. The inlet end of the cylindrical screen 59 is connected to the suction inlet 56 and the other end to the discharge tube 57, respectively, further the screen 59 is secured inside the transfer tube 55. A screw conveyor 50 is disposed in the cylindrical screen 59. A rotating shaft 61 is supported by the bearing part provided at the outer wall of the discharge tube 57, and the belt 64 is looped around a pulley 62 rigidly mounted on the shaft 61 and a pulley 63 rigidly mounted on the rotating shaft 53 of the fans 54.

An outlet shutter cover 65 is connected to the upper opening of the discharge pipe 52. A rod 66 pivoted to the discharge pipe 52 is secured to one side of the outlet shutter cover 65, and a weight 67 is slidably mounted on a bent portion of one end of the rod 66 so as to always press the outlet shutter cover 65 against the outlet of the discharge tube 57. A driven pulley 68 is rigidly mounted on one end of the rotating shaft 53.

When the pulley 68 is driven the rotating shafts 53 and 61 are rotated by the pulley 63, the belt 64 and the pulley 62 to rotate the fans 54 and the conveyor screw 60.

A suction nozzle not shown is attached to the tip of the suction hose 58. When the suction nozzle is inserted into the accumulated material, the material is sucked into the cylindrical screen 59 together with the outside air by way of the suction inlet 56 of the suction pipe 51. The air passes through the screen 59 and is sucked into the section tube 51 to separate the material from the air, the air is then sucked into the suction fan chamber 48 by way of the suction inlet 50 and at the same time, the sucked air passes inside the discharge tube 52 by the blowing action due to the rotation of the fans 54 and is discharged outside the machine from the opening at the end of the tube.

On the other hand, the material separated from the air is gradually conveyed into the discharge tube 57 by the rotating screw conveyor 60 along the inside surface of the cylindrical screen. 59. The outlet shutter cover 65 is pushed open by the material. The outlet shutter cover 65 is opened by its weight with the rod 66 as the fulcrum against the weight 67 moves downward to open the outlet of discharge tube 57. The material drops from the outlet at the upper surface into the discharge pipe 52 and at the same time, it is conveyed outside the machine by the ejection wind passing in the discharge pipe 52 to carry out suction conveyance of the material continuously.

Also, more than two partitions, having holes in the middle, may be provided in the suction fan chamber 48 to divide the suction fan chamber 48 into more than three chambers and provide a fan in each chamber in order to make the wind stronger. Also, this suction fan chamber may be a single chamber. Furthermore, the same action can be obtained by attaching a spring to the rod 66 of the outlet shutter cover 65 in place of a weight.

Referring to FIGS. 7, 8, 9, 10 and 11, the fourth embodiment of the suction conveyor of the invention is provided with a cylindrical fan chamber 69 formed into trunco-conical form, and a suction pipe 70 is connected to the opening at the inlet end of the fan chamber 69, and a discharge pipe 71 at the outlet at the other end of the fan chamber, respectively.

A cylinder 72 is disposed in the suction fan chamber 69 in such a way that the cylinder 72 is positioned concentrically with the suction fan chamber 69, and the cylinder 72 is located at the intermediate part in the suction fan chamber 69 at the side of discharge pipe 71. A trunco-conically shaped transfer tube 74 is rigidly connected to the suction fan chamber 69 by means of supporting rods and is provided with a screen having particular size of the mesh for preventing passing of the conveyed material. The end portion of the tube 74 having small diameter is rigidly connected to the tip of the suction pipe 70 at a position facing the cylinder 72. The end portion of the tube 74 having large diameter is fixed to the inside surface of the intermediate part of the suction fan chamber 69 so as to dispose the transfer tube 74 inside the suction passage formed between a fan 75 and the suction pipe 70. The fan 75 is disposed at the periphery of the cylinder 72, and its central shell part is rotatably supported by the cylinder 72 and the edges of the vanes of the fan 75 are disposed such that they are close to the inside circumferential surface of the cylindrical fan chamber 69. A pair of bearings 76 and 74 are disposed at the center of the inlet portion and the other end of the cylindrical fan chamber 69, respectively, so as to support in the chamber 69 by means of arms 78 and 79. The bearings 76 and 77 support both end portions of the rotating shaft 80 which passes through the suction fan chamber 69 and the cylinder 72.

A screw conveyor 81 is secured to the rotating shaft 80, in the cylinder 72. The screw conveyor 82 having helical shape is disposed inside the transfer tube 74 in such a way that the peripheral surface of the screw conveyor 82 is closely positioned to the inside wall of the transfer tube 74. The helical-shaped portion of the screw conveyor 72 is made of certain metallic wire. An end of the screw conveyor 82 having small diameter is connected to an inlet end of the screw conveyor 81 and an extending end of the screw conveyor 82 having large diameter is fixed to the rotating shaft 80. A conical cover 83 is disposed to a position facing the opening of the other end of the cylinder 72. A central hole of the cover 83 is fitted slideably on the rotating shaft 80 and at the same time, a spring 84 is mounted on the rotating shaft 80 between a base plate of the cover 83 and the bearing 77 so that the cover 73 is normally maintained closed condition by spring 84 while contacting the outlet of the other end of the cylinder 72.

A pulley 85 is mounted on the back surface of the central shell of the fan 75 and is disposed inside a shutter cover 86 which is secured to the inside of the cylindrical fan chamber 69, and a belt 87 which passes through an aperture in the circumferential wall of the cylindrical fan chamber 69 is looped around the pulley 85. A pulley 88 is secured to the back end of the rotating shaft 80 and is disposed inside the cover 89 which is fixed inside the discharge pipe 71, and a belt 90 which passes through the aperture of the circumferential wall of the discharge pipe 71 is looped around the pulley 88.

Next, the operation of the suction conveyor of the above-mentioned forth embodiment of the invention is explained. First, a flexible hose, not shown, is connected to the opening at the tip of the suction pipe 70. Then the fan 75 and the rotating shaft 80 are driven by the belt 87 and the pulley 85, and the belt 90 and the pulley 88, respectively, to rotate the fan 75 at a high speed, and to drive the rotating shaft 80 and the screw conveyor 82 at a slow speed, respectively. When the hose connected to the suction pipe 70 is inserted into the accumulated material, the material is sucked into the suction fan chamber 69 by way of the suction pipe 70 together with outside air. The material and air are separated by means of the screen which forms the transfer tube 74. The material is moved through the transfer tube 74 and the cylinder 72 which is connected to the transfer tube 74 by means of the screw conveyors 82 and 81, respectively, until the material reaches the outlet of the cylinder 72. The cover 83 slides against the spring 84 by the pressure of the material which is moved gradually to the outlet to form a gap between the cover 83 and the outlet. The material drops from this gap into the suction fan chamber 69 and at the same time, it passes through the discharge pipe 72 by the wind pressure caused by the rotation of the fan 75 and is conveyed outside the suction fan chamber 69.

In this invention, a suction fan chamber to which a suction pipe and a discharge pipe are connected is provided. Transfer tube provided with a screen for separating air and the material to be sucked and conveyed, and a screw for moving the separated material is provided in the sucked air passage. The outlet of the transfer tube is connected to the discharge pipe of the suction fan chamber, and a cover is maintained under pressure at this connecting part so that the material is sucked together with outside air into the suction tube. The material is separated from the sucked air by means of the screen installed in the suction passage. The material is conveyed and introduced into the discharge pipe and conveyed by means of discharged wind from the fan chamber without passing through the fan chamber only, by driving the fan shaft and the screw conveyor and inserting the opening at the tip of the flexible suction hose connected to the suction pipe into the accumulated material.

While a preferred embodiment of the suction conveyor according to the invention has been shown and described, it will be understood that many modifications and changes can be made within the scope of the invention.

What We claim is:

1. A suction conveyor comprising a suction fan chamber having a suction inlet aperture and an outlet aperture, a suction pipe connected to said suction inlet aperture, a discharge pipe connected to said outlet aperture, said suction pipe and discharge pipe each having an opening intermediate its length, a cylindrical transfer tube having its ends connected to said openings, a screw conveyor coaxially mounted for rotation within said transfer tube and extending into said suction pipe, a screen mounted transversely within said suction pipe between said transfer pipe and fan chamber and disposed immediately adjacent said screw conveyor, shutter cover means mounted within said discharge pipe and normally pressing against the end of said transfer tube connected to said discharge pipe.

2. A suction conveyor for pneumatically conveying materials such as grains including, in combination, an air chamber having inlet and outlet openings and having pneumatic suction means mounted therein for causing air to flow through said chamber between said openings; a suction pipe connected to said inlet opening; a discharge pipe connected to said outlet opening; a transfer tube interconnected between said suction and discharge pipes for bypassing said air chamber; a screw conveyor disposed within said transfer tube for carrying grain from said suction pipe to said discharge pipe; a screen disposed within said suction pipe between said transfer tube and said air chamber; and a shutter cover positioned to block the transfer tube at its connection to said discharge pipe; an improvement comprising means engaging said cover for releasably urging said cover into said blocking position and to release said cover under the force of grain advanced by said screw conveyor, and suction adjusting means wherein the walls of said air chamber define a plurality of suction holes disposed on the side of said pneumatic suction means opposite said outlet opening, and a slide cover slideably mounted on the wall of said air chamber for selective movement to open or close said suction holes.

3. A suction conveyor for pneumatically conveying materials such as grains including, in combination, an air chamber having inlet and outlet openings and having pneumatic suction means mounted therein for causing air to flow through said chamber between said openings; a suction pipe connected to said inlet opening; a discharge pipe connected to said outlet opening; a transfer tube interconnected between said suction and discharge pipes for bypassing said air chamber; a screw conveyor disposed within said transfer tube for carrying grain from said suction pipe to said discharge pipe; a screen disposed within said suction pipe between said transfer tube and said air chamber; and a shutter cover positioned to block the transfer tube at its connection to said discharge pipe; an improvement comprising means engaging said cover for releasably urging said cover into said blocking position and to release said cover under the force of grain advanced by said screw conveyor, suction and discharge fans included in said pneumatic suction means, said fans being coaxially mounted within said air chamber, said air chamber having an air supply opening therein on the side of said suction fan opposite said inlet opening, whereby said discharge fan discharges air drawn both from said suction fan and said air supply opening.

4. A suction conveyor for pneumatically conveying materials such as grains including, in combination, an air chamber having inlet and outlet openings and having pneumatic suction means mounted therein for causing air to flow through said chamber between said openings; a suction pipe connected to said inlet opening; a discharge pipe connected to said outlet opening; a transfer tube interconnected between said suction and discharge pipes for bypassing said air chamber; a screw conveyor disposed within said transfer tube for carrying grain from said suction pipe to said discharge pipe; a screen disposed within said suction pipe between said transfer tube and said air chamber; and a shutter cover pivotally connected to said discharge pipe to block said discharge pipe at its connection to said air chamber, said shutter cover having a rod attached thereto, and a weight connected to said rod to urge said cover into said blocking position, whereby said materials carried by said screw conveyor push said cover pivotally away from said blocking position.

5. The invention as set forth in claim 1, in which said screw conveyor comprises a brush portion disposed to engage said screen for cleaning said screen upon rotation of said screw conveyor.